United States Patent Office 3,825,460
Patented July 23, 1974

3,825,460
THIN-WALLED CARBONACEOUS HONEYCOMB STRUCTURES AND PROCESS FOR MAKING SAME
Takayuki Yoshikawa and Eiichi Hisada, Nagoya, and Tooru Hujii, Yokkaichi, Japan, assignors to Nippon Toki Kabushiki Kaisha (Noritake Co., Ltd.), Nagoya-shi, Japan
Filed Dec. 29, 1971, Ser. No. 213,425
Claims priority, application Japan, May 18, 1971, 46/33,519
Int. Cl. B29c 25/00; B32b 1/08
U.S. Cl. 156—296  10 Claims

ABSTRACT OF THE DISCLOSURE

A thin-walled carbonaceous honeycomb structure having a large surface to weight ratio and consisting of thin-walled carbonaceous cells; and a process for making the same. The process includes coating elongated tube or rod elements with a coating material capable of being carbonized, arranging the elongated elements so that they contact one another to form a honeycomb-like block, drying the coated elements so arranged, removing the elongated element substrates from the dried honeycomb-like block if the substrates, themselves, are not capable of being carbonized, and firing said honeycomb-like block to achieve the carbonaceous product.

---

This invention relates to carbonaceous honeycomb structures made up of thin-walled cells with a large surface-to-weight ratio and to a process for forming the same.

According to this invention, there can be manufactured even extremely thin-walled, carbonaceous honeycomb structures with a large surface to weight ratio and there can further be produced honeycomb structures consisting of honeycomb cells which have any size and shape and are made of any carbonaceous material, depending on the use of the honeycomb structures. In addition, these honeycomb structures can easily be manufactured by the process of this invention.

The honeycomb structures which are publicly known are, for example, metal-made ones such as aluminum-made ones which are light in weight and iron-made ones which are excellent in structural strength, synthetic resin-made ones and ceramics-made ones. Although these conventional structures are different in use depending on the kind of material from which they are made, they have heretofore been used as a light-weight reinforcing structural material, heat exchanger, catalyst carrier, catalyst support, packing material or the like.

The novel carbonaceous honeycomb structures prepared according to this invention may also be effectively used as a light-weight refractory reinforcing element, heat exchanger, catalyst or catalyst carrier, or adsorbent material. They contain many parallel cells through the body from one surface to the opposite one. The term "cell" used herein means a narrow hollow body having a thin wall and a specific shape in cross-section. To form a honeycomb structure, such cells are bound into a bundle wherein they are bonded with one another.

In the accompanying drawing, FIG. 1 is a perspective view of a carbonaceous honeycomb structure of this invention consisting of honeycomb cells which are circular in cross-section;

Figure 4:
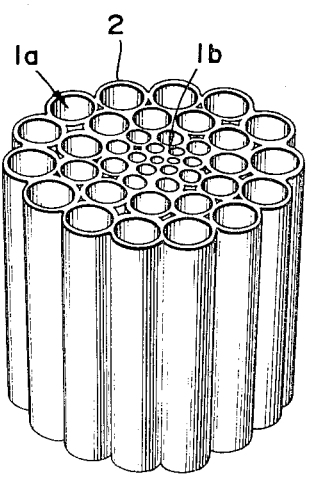
FIG. 4 is a perspective view of a carbonaceous honeycomb structure consisting of cell groups which are different in size of cell cross-section.
Figure 5:
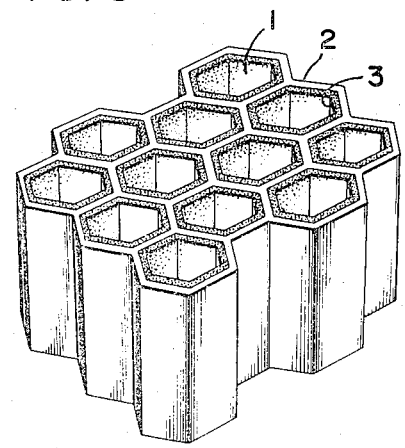
FIG. 5 is a perspective view of a carbonaceous honeycomb structure consisting of cells which are hexagonal in cross-section and have a two-layer wall.

Referring now to the accompanying drawing, the honeycomb structures of this invention will be detailed below. According to this invention, there can be produced various carbonaceous thin-walled honeycomb structures consisting of honeycomb cells which may be circular, elliptical, triangular, polygonal or the like in cross-section as seen from FIGS. 1 to 5 and which may have a cell size 1 of as small as 1.0 mm. and a wall 2 of as thin as 0.1 mm. As shown in FIG. 4, it is also possible to obtain a honeycomb structure wherein two or more groups of differently sized and/or shaped cells are symmetrically or asymmetrically arranged.

The terms "cell shape" and "cell size" used herein mean the cross-sectional shape of a cell and the inner diameter of a cell if its cell shape is circular (or the distance between the opposing inner sides if polygonal with even-numbered sides, or approximately the distance between one of the apexes and the side opposing to the apex if triangular or polygonal with odd-numbered sides), respectively.

The process of this invention is summarized as follows.
Rods or cylinders the cross-sectional size and shape of which are the same as those of the cells being manufactured, are immersed in a slurry of carbon or organic carbonizable powder and an organic binder in a suitable solvent, withdrawn from the slurry and then centrifugalized to remove an excess of the slurry attached thereto leaving the required amount of the slurry thereon. Prior to drying of the slurry coated, the thus-coated rods or cylinders are arranged so that they contact with each other to form a green honeycomb block. The green block is then dried. The dried green block is fired by heating to a temperature at which the rod or cylinder substrates are carbonized, in a non-oxidizing atmosphere such as a nitrogen stream to obtain a honeycomb structure if the substrates are those which are prefectly carbonized during firing, whereas it is fired as mentioned above after removing the substrates out of the green block to obtain a honeycomb structure if they are those which are not completely carbonized during firing. The carbonizing temperature and time vary with the components of the slurry. Depending upon their uses, the once carbonized products may be impregnated with a natural or synthetic resin which may then be carbonized or they may be treated for activation to increase their specific surface area, that is, surface to weight ratio.

A coating material for use in covering the rod or cylinder substrates is composed essentially of a powdered carbon or a powdered organic material which is capable of being carbonized when fired and of an organic binder therefor. Before coated, the coating material is dissolved, suspended or emulsified in a suitable solvent to form a slurry thereof.

As mentioned above, this invention is directed to a thin-walled, carbonaceous structure with a large surface-to-weight ratio and to a process for manufacturing the same.

Honeycomb structures, in general, are extremely large in surface to weight ratio and superior in mechanical strength. Because of this, they are very useful as, for example, catalysts or catalyst carriers which are frequently used in the chemical industry. They are advantageously used in a reaction system wherein reactants react with each other while flowing in gaseous or liquid phase, due to their extremely small resistance to the flow of the reactants.

As is well known, carbon varies in crystal form from amorphous carbon through graphite to diamond. There has recently been produced a new form of carbon such as Glassy Carbon (the trademark of Tokai Electrode Co., Ltd., Japan) in some countries.

The carbonaceous materials of which the honeycomb structures of this invention are composed, may be carbon in each of said crystal forms or in said Glassy Carbon form. By the process of this invention the starting carbonaceous materials from which the honeycomb structures of this invention will be made, can be changed in degree of crystallization depending on the use of the structures and can be locally differently changed in degree of crystallization. For example, if the structures being produced are intended to be used as a catalyst or catalyst carrier in chemical processes, they will be required to be high in chemical activity. In this case the surface of the structures or the whole thereof should be activated to be made active carbon.

If the structures being produced are intended to be used as a refractory reinforcing element which requires mechanical strength, they will be made a dense graphite in quality or crystal form.

The structure of the honeycomb structures varies not only with said quality or crystal form of the carbonaceous material from which the honeycomb cells are made but with the shape, size and arrangement of the cells. The cells may be made, for instance, circular, elliptical, triangular or polygonal in cross-sectional shape. They may also be made so that they have a desired cell size, shape and/or length. The cell size is preferably 1.0–10.0 mm. according to this invention. The cells may further be made with a desired thickness which preferably ranges from 0.1 mm. to 5 mm. The optimum thickness of the cells is determined in compliance with the size of cross-section, that is, cell size thereof.

The honeycomb structures of this invention may be composed of, in combination, two or more groups of cells which are different in cell shape and size. For instance, there may be produced a honeycomb structure wherein cells of small cell size positioned centrally with respect to the longitudinal axis of the structure are surrounded by those of large cell size, as shown in FIG. 4.

As previously mentioned, the process of this invention comprises the steps of coating rods or tubes with a slurry of a coating material which is capable of being carbonized when fired in a non-oxidizing atmosphere, arranging the slurry-coated rods or tubes so that they contact one another as predetermined to form a green block or structure having a predetermined appearance, drying the green structure and, after withdrawing the rod or tube substrates from the dried green structure if they are not carbonizable when fired in a non-oxidizing atmosphere or without withdrawing them if they are carbonizable when fired in such an atmosphere, firing the dried green structure in a non-oxidizing atmosphere to obtain a honeycomb structure the body of which has been carbonized.

Coating materials which may be carbonized by firing in a non-oxidizing atmosphere, include carbon powder such as carbon black, natural or artificial graphite powder, coke powder and coal powder; and organic materials such as sugar, powdered thermosetting synthetic resin (for example, a phenol-formaldehyde resin in powder form), powdered coconut shell, powdered walnut shell and short-cut natural or artificial fibers. It is necessary, however, to incorporate the coating material with a suitable organic binder therefor since the former will provide green moldings having poor strength when coated and molded on the rod or tube substrates without the latter. Binders which may be used include phenol-formaldehyde resins, urea resins, expoxy resins and glue. Solvents which may be used in making a slurry of such coating material and binder, are water, ethyl alcohol, methyl alcohol, ethyl methyl ketone, toluene and the like. The rods or tubes used to form a coating or molding thereon will determine the shape and size of the cells of a honeycomb structure to be obtained and they should therefore have a shape and size required to form the cells. For instance, round rods or tubes of approximately 2 mm. in outer diameter may be used to manufacture a honeycomb structure composed of tubular cells of about 2 mm. in inner diameter The rods or tubes which may be used, are qualitatively divided into three groups A, B and C. The group A includes rods or tubes which can be carbonized by firing in a non-oxidizing atmosphere. These rods or tubes may be made of paper or a thermosetting resin such as a phenol-formaldehyde resin prepared by polycondensation. The group B includes rods or tubes made of a metal such as aluminum or iron, which cannot be carbonized by firing in a non-oxidizing atmosphere. The group C includes rods or tubes made of a thermoplastic synthetic resin such as polyvinyl chloride or polyethylene, which can be removed by melting, dissolving in a solvent, or the like. The rods or tubes of the group A may be carbonized in situ when fired in a non-oxidizing atmosphere, those of the group B must be withdrawn before firing in a non-oxidizing atmosphere and those of the group C may be withdrawn or dissolved in a solvent before firing or may be molten during firing in a non-oxidizing atmosphere.

The carbonization step according to this invention is as follows.

The green honeycomb block or structure may be fired in an atmosphere which is made non-oxidizing by passing therethrough an inert gas such as nitrogen, helium, a gaseous mixture of hydrogen and nitrogen, an ammonia decomposition gas ($N_2+H_2$), carbonic acid gas or the mixtures thereof or it may be fired in carbonaceous powder, such as graphite or coal powder, within it is buried. The firing temperatures and times may widely vary depending on the required quality of honeycomb structures to be manufactured.

If the material composing a final honeycomb structure being obtained is required to be amorphous carbon, the firing temperature used should be in a relatively low range of from 400 to 500° C., while if such material is required to be graphite the firing temperature used should be high enough for graphitization.

The carbonaceous material of an ordinary honeycomb structure may partially be made activated carbon. For example, the activation may be effected at about 1000° C. in an atmosphere wherein oxygen is incorporated in a small amount or may be effected in the presence of steam at about 1000° C.

If the honeycomb structures prepared according to this invention are desired to be further increased in mechanical strength, they may be further treated. The further treatment may be effected by, for example, impregnating the honeycomb structures with a resin, heating the resin-impregnated structures to cure the resin so impregnated and, if required, again firing the thus-treated structures in a non-oxidizing atmosphere to carbonize the cured resin. The resins which may be used include a phenol-formaldehyde resin. The resin may be dissolved in methanol, etc., and used in the impregnation.

This invention will be illustrated by the following examples.

Example 1

Round metallic rods (2.5 mm. $\phi$ x 300 mm. long) were wound doubly with thin paper and vertically dipped so deep in a slurry of the following composition that their lower end reached 150 mm. below the surface of the slurry for three seconds to form a 1.0 mm. thick coating of the slurry on the part of the rods so dipped.

Composition of the slurry

| | Parts by weight |
|---|---|
| Carbon black powder | 70 |
| Powdered phenol-formaldehyde resin [1] | 30 |
| Methanol | 50 |

[1] Supplied under the trademark of PR-217 N by Sumitomo Bakelite Co., Ltd., Japan.

Figure 1:
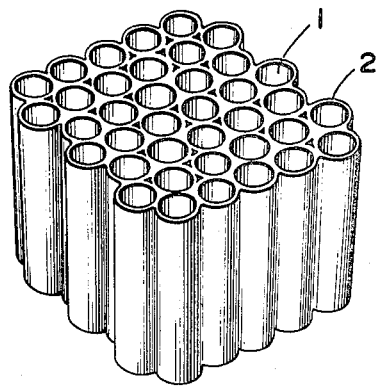
Figure 2:
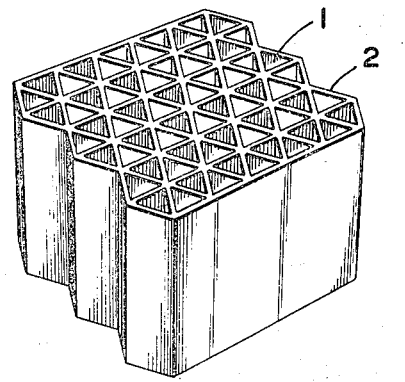
FIG. 2 is a perspective view of a carbonaceous honeycomb structure of this invention consisting of cells which are triangular in cross-section.
Figure 3:
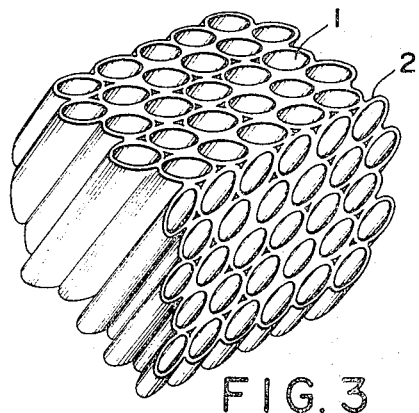
FIG. 3 is a perspective view of a carbonaceous honeycomb structure wherein the longitudinal axes of the honeycomb cells are non-perpendicular to two parallel planar surfaces of the structure.

Five hundred rods so coated were horizontally piled up so that they together formed a predetermined cube (60 mm. x 100 x 150 mm.), and then dried at room temperatures. The dried cube was separated from the rod substrates by slipping them out of the cube, to obtain a green honeycomb structure. The green structure was fired to a temperature of 1000° C. at a temperature-raising rate of 100° C./hour and then allowed to cool to a room temperature to yield a carbonaceous honeycomb structure having an overall size of 60 mm. x 100 mm. x 150 mm. and consisting of honeycomb cells having a diameter of 2.3 mm. and wall of 0.2 mm. in thickness as shown in FIG. 1.

Example 2

Following the procedure of Example 1, the same metallic rods as used in Example 1 were dipped in a slurry of the following composition to be coated with the slurry.

Composition of the slurry

| | Parts by weight |
|---|---|
| Natural scaly graphite in powder form | 80 |
| Liquid phenol-formaldehyde resin [1] | 20 |
| Water | 50 |

[1] Supplied under the trademark of PR-940 by Sumitomo

Five hundred rods so coated were horizontally piled so that they together formed a predetermined cylindrical shape having a size of 85 mm. $\phi$ x 150 mm., dried at a room temperature for 24 hours and further dried in a drying chamber at 110° C. for 8 hours to yield a green block. The green block was freed of the rod substrates by slipping them therefrom to obtain a green honeycomb structure which was then buried in natural scaly graphite powder filled in a refractory vessel, fired to a temperature of 1200° C. at a temperature-raising rate of 100° C./hour and allowed to cool to a room temperature thereby obtaining a cylindrical graphite honeycomb structure having an overall size of 80 mm. $\phi$ x 150 mm. and consisting of honeycomb cells having a diameter of 2.3 mm. and a wall of 0.3 mm. in thickness.

Example 3

Paper-made tubes having a 3-mm. diameter and a 200-mm. length were immersed in a slurry of the following composition to form an approximately 2 mm. thick coating of carbonaceous material on the paper-made tubes.

Composition of the slurry

| | Parts by weight |
|---|---|
| Walnut shell powder of 100$\mu$ or finer in particle size | 90 |
| Tar pitch | 10 |
| Toluol | 50 |

While keeping them substantially horizontal, one hundred tubes thus coated were piled to form a predetermined block having an overall size of 35 mm. $\phi$ x 150 mm. The block was dried at 110° C., thereafter fired at a temperature-raising rate of 50° C./hour to a temperature of 600° C. in an atmosphere of ammonia decomposition gas and then maintained at this temperature in the same atmosphere for two hours to obtain a corbonaceous honeycomb structure made of amorphous carbon having a specific surface area of about 300 m.$^2$/g.

Example 4

Thin paper was doubly wound on pencil-like wooden rods which were 180 mm. long and have a hexagonal cross-section having six sides of approximately 4 mm. each. The paper-wound rods were dipped so deeply in a slurry of the following composition that their lower end reachedf 160 mm. below the surface of the slurry to form an approximately 2.5 mm. thick and 160 mm. long coating of carbonaceous material.

Composition of the slurry

| | Parts by weight |
|---|---|
| α-cellulose fibers (in short-cut form) | 40 |
| Cured, phenol-formaldehyde resin (in powder form) | 40 |
| Vinyl acetate | 20 |
| Water | 130 |

The rods so coated were piled to form a predetermined block of a size of 160 mm. x 110 mm. x 110 mm. which was dried at a room temperature until the coatings decreased to 30% in moisture content and then dried in a drier at 80° C. for 15 hours. The block thus dried was freed of the rod substrates by pulling them out thereof to obtain a green honeycomb structure which was then fired at a temperature-raising rate of 50° C./hr. to 1000° C. and thereafter allowed to cool to a room temperature thereby yielding a honeycomb structure of 150 mm. x 100 mm. x 100 mm. which was composed of amorphous carbon and consisted of honeycomb cells with a hexagonal cross-section having six sides of 3.8 mm. each.

Example 5

A green honeycomb structure prepared in the same manner as in Example 1 was fired at a temperature-raising rate of 100° C./hr. to 600° C. in a nitrogen stream to produce a carbonized structure which was then activated at a temperature of 700–1000° C. in the presence of steam thereby obtaining a carbonaceous honeycomb structure wherein the carbon has been activated. This structure had a specific surface area (a surface to weight ratio) of about 800 m.$^2$/g.

Example 6

A green honeycomb structure prepared in the same manner as in Example 1 was fired at a temperature-raising rate of 100° C./hr. to a temperature of 1000° C. in a stream of nitrogen to produce a carbonized structure which was further treated with the following treating mixture to form a coating of the mixture on the structure, fired at a temperature-raising rate of 100° C./hr. to 600° C. to carbonize this coating and then heated to 700–1000° C. in a stream of steam to activate this carbonized coating only. The activated, carbonaceous honeycomb structure so obtained had a specific surface area of about 300 m.$^2$/g.

Composition of the treating mixture

| | Parts by weight |
|---|---|
| Powdered, phenol-formaldehyde resin [1] | 60 |
| Methanol | 40 |

[1] Supplied under the trademark of PR 217 N by Sumitomo Bakelite Co., Ltd., Japan.

Example 7

The graphite honeycomb structure prepared in Example 2 was buried in graphite powder blended with silicon carbide powder and then allowed to pass direct electric current therethrough to heat the structure to about 1800° C. and consequently promote graphitization thereby obtaining a further graphitized honeycomb structure having an electric resistance of of 0.01Ω.

Example 8

The carbonaceous honeycomb structure prepared in Example 3 was treated with the following treating mixture of the following composition to form thereon a coating of the mixture, which coating was then cured to strengthen the structure.

Composition of the treating mixture

| | Parts by weight |
|---|---|
| Epoxy resin [1] | 70 |
| Curing agent [2] | 10 |
| Diluent [3] | 20 |

[1] Supplied under the trademark of Epikote 818 by Shell Chemical Co., Ltd.
[2] Supplied under the trademark of Epicure Z by the same company.
[3] Supplied under the trademark of Cardura E by the same company.

Example 9

The carbonaceous honeycomb structure prepared in Example 3 was treated with the following treating mixture to form a coating thereof on the structure and then fired at a temperature-rising rate of 100° C./hr. to 600° C. in a nitrogen stream to carbonize said coating.

Composition of the treating mixture

| | Parts by weight |
|---|---|
| Liquid phenol-formaldehyde resin [1] | 80 |
| Methanol | 20 |

[1] Supplied under the trademark of PR 940 by Sumitomo Bakelite Co., Ltd.

What we claim is:

1. A process for producing a thin-walled carbonaceous honeycomb structure which comprises (1) coating elongated tube or rod elements having a desired cross-sectional shape with a material capable of being carbonized when fired in a non-oxidizing atmosphere, said elongated elements being made of a material capable of being carbonized when fired in a non-oxidizing atmosphere, (2) arranging the coated elongated elements so that they contact one another and together form a desired honeycomb-like block, (3) drying the coated elongated elements so arranged and then (4) firing the arranged coated elongated elements thus dried in a non-oxidizing atmosphere to carbonize the elongated element substrates and the coatings formed thereon thereby forming carbonaceous cells bonded with one another which constitute the thin-walled carbonaceous honeycomb structure.

2. A process as claimed in claim 1, wherein the non-oxidizing atmosphere is one filled with carbon powder.

3. A process as claimed in claim 1 wherein said elongated elements are made of paper.

4. A process as claimed in claim 1 wherein said elongated elements are made of a thermosetting resin.

5. A process for producing a thin-walled carbonaceous honeycomb structure having a large surface-to-weight ratio which comprises (1) winding thin paper around metallic elongated tube or rod elements having a desired cross-sectional shape, (2) coating the wound elongated elements with a coating material composed essentially of a powdered carbonaceous material carbonizable when fired in a non-oxidizing atmosphere and of an organic binder therefor, (3) arranging the coated elongated elements so that they contact one another and together form a desired honeycomb-like block, (4) drying the coated elongated elements so arranged, (5) removing the elongated element substrates out of the dried coated material to obtain a honeycomb-like block free of said elongated elements, and then (6) firing said honeycomb-like block in a non-oxidizing atmosphere to carbonize the block thereby producing the thin-walled carbonaceous honeycomb structure.

6. A process as claimed in claim 5, wherein the non-oxidizing atmosphere is one filled with carbon powder.

7. A process for producing a thin-walled carbonaceous honeycomb structure having a large surface-to-weight ratio which comprises (1) winding thin paper around thermoplastic elongated tube or rod elements, (2) coating the wound elongated elements with a coating material composed essentially of a powdered carbonaceous material carbonizable when fired in a non-oxidizing atmosphere and of an organic binder therefore, (3) arranging the coated elongated elements so that they contact one another and together form a desired honeycomb-like block, (4) drying the coated elongated elements so arranged, (5) removing the elongated element substrates from the dried coated material to obtain a honeycomb-like block free of said elongated elements, and then (6) firing said honeycomb-like block in a non-oxidizing atmosphere to carbonize the block thereby producing the thin-walled carbonaceous honeycomb structure.

8. A process as claimed in claim 7 wherein said step of removing said elongated elements includes longitudinally withdrawing said elongated elements from said dried coated material.

9. A process as claimed in claim 7 wherein said step of removing said elongated elements includes dissolving said elongated elements with a solvent.

10. A process as claimed in claim 7 wherein said step of removing said elongated elements includes heating said elongated elements to melt the latter.

References Cited

UNITED STATES PATENTS

| 2,369,006 | 2/1945 | Banks | 156—197 |
|---|---|---|---|
| 3,632,385 | 1/1972 | Schmitt et al. | 161—68 |
| 3,275,428 | 9/1966 | Siegmund | 156—197 |
| 3,667,984 | 6/1972 | Adams | 161—68 |
| 2,749,254 | 6/1956 | Slyh et al. | 117—46 CC |
| 3,574,646 | 4/1971 | Wismer et al. | 264—29 |

GEORGE F. LESMES, Primary Examiner

P. J. THIBODEAU, Assistant Examiner

U.S. Cl. X.R.

117—46 CC; 161—68; 252—421; 264—29